United States Patent
Zhang

(10) Patent No.: US 9,985,822 B2
(45) Date of Patent: May 29, 2018

(54) SERVICE CHAIN MANAGEMENT METHOD, DELIVERY NODE, CONTROLLER, AND VALUE-ADDED SERVICE NODE

(71) Applicant: Huawei Technologies Co., Ltd., Shenzhen (CN)

(72) Inventor: Lin Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 14/937,004

(22) Filed: Nov. 10, 2015

(65) Prior Publication Data

US 2016/0134465 A1    May 12, 2016

(30) Foreign Application Priority Data

Nov. 12, 2014   (CN) .......................... 2014 1 0634839

(51) Int. Cl.

| | |
|---|---|
| *H04L 12/24* | (2006.01) |
| *H04L 12/911* | (2013.01) |
| *H04L 12/721* | (2013.01) |
| *H04L 12/813* | (2013.01) |
| *H04L 12/703* | (2013.01) |

(52) U.S. Cl.
CPC ...... *H04L 41/0654* (2013.01); *H04L 41/0677* (2013.01); *H04L 41/5054* (2013.01); *H04L 45/26* (2013.01); *H04L 45/28* (2013.01); *H04L 47/20* (2013.01); *H04L 47/70* (2013.01)

(58) Field of Classification Search
CPC ............. H04L 41/0654; H04L 41/0677; H04L 41/0668; H04L 41/0681; H04L 41/5009; H04L 41/5054; H04L 43/0805; H04L 43/0817; H04L 43/0852; H04L 43/0864; H04L 43/16; H04L 45/26; H04L 45/28; H04L 47/20; H04L 47/70
See application file for complete search history.

(56) References Cited

U.S. PATENT DOCUMENTS

2007/0027974 A1* 2/2007 Lee ..................... H04L 41/0681
                                                                      709/223
2013/0163606 A1  6/2013 Bagepalli et al.

OTHER PUBLICATIONS

Meng, W., et al., "Redundancy Mechanism for Service Function Chains", draft-meng-sfc-chain-redundancy-00, Jul. 4, 2014.*
Bitar, N., et al., "Interface to the Routing System (I2RS) for Service Chaining: Use Cases and Requirements," draft-bitar-i2rs-service-chaining-01, Feb. 14, 2014, 15 pages.
(Continued)

*Primary Examiner* — Khoa Huynh
(74) *Attorney, Agent, or Firm* — Conley Rose, P.C.

(57) ABSTRACT

A service chain management method, a delivery node, a controller, and a value-added service node are provided. An ingress delivery node of a service chain receives a detection packet for detecting the service chain, where the service chain includes at least one value-added service node, and the detection packet carries status information of each value-added service node; and the ingress delivery node determines whether the service chain is in a normal running state according to the detection packet. By using the present invention, management on a service chain can be implemented, thereby improving reliability of the service chain.

20 Claims, 7 Drawing Sheets

(56) References Cited

OTHER PUBLICATIONS

Meng, W., et al., "Redundancy Mechanism for Service Function Chains," draft-meng-sfc-chain-redundancy-00, Jul. 4, 2014, 13 pages.
Li, H., et al., "Service Function Chaining (SFC) Control Plane Architecture," draft-ww-sfc-control-plane-03, Sep. 22, 2014, 18 pages.
Lee, S., et al., "Resource Management for Dynamic Service Chain Adaptation," draft-lee-nfvrg-resource-management-service-chain-00, Oct. 23, 2014, 10 pages.
Foreign Communication From a Counterpart Application, European Application No. 15191362.1, Extended European Search Report dated Feb. 10, 2016, 12 pages.

\* cited by examiner

SERVICE CHAIN MANAGEMENT METHOD, DELIVERY NODE, CONTROLLER, AND VALUE-ADDED SERVICE NODE

CROSS-REFERENCE TO RELATED APPLICATION

This application claims priority to Chinese Patent Application No. 201410634839.0, filed on Nov. 12, 2014, which is hereby incorporated by reference in its entirety.

TECHNICAL FIELD

The present invention relates to the field of communications technologies, and in particular, to a service chain management method, a delivery node, a controller, and a value-added service node.

BACKGROUND

A data center refers to a suite of integrated Information Technology (IT) application environment that implements, in physical space, centralized processing, storage, transmission, exchange, and management of data. In a current data center network, deployment of a value-added service device, such as a firewall or an intrusion prevention system (IPS), is closely related to a network topology, and the close correlation between a value-added service and the network topology causes the deployment of the value-added service device to be extremely inflexible. Therefore, to flexibly deploy a value-added service device in a data center network, a service chaining technology is provided. The service chaining is a new mode of deploying a virtual service in a virtual and cloud-computing-based data center network.

As shown in FIG. 1, in an existing service chaining technology, a centralized delivery node (DN) is deployed in front of a server, where the centralized delivery node includes a distributed virtual switch, and each value-added service node (SN) is directly connected to the delivery node. The delivery node determines which traffic needs to be delivered to which value-added service nodes for processing and a service processing sequence. On a service chain from a client to the server shown in FIG. 1, the DN first sends a service flow to SN1; SN1 processes the service flow and returns the processed service flow to the DN; the DN then sends the service flow processed by SN1 to SN2, and SN2 processes the service flow and returns the processed service flow to the DN; the DN then sends the service flow processed by SN1 and SN2 to SN3, and SN3 processes the service flow and returns the processed service flow to the DN. In the foregoing manner, if one value-added service node is faulty, for example, when SN1 breaks down, the service chain from the client to the server is interrupted. It can be seen that, the service chain in the prior art has extremely low reliability.

SUMMARY

The present invention provides a service chain management method, a delivery node, a controller, and a value-added service node, which can improve reliability of a service chain.

A first aspect of the present invention provides a service chain management method, including receiving, by an ingress delivery node of a service chain, a detection packet for detecting the service chain, where the service chain includes at least one value-added service node, and the detection packet carries status information of each value-added service node; sending, by the ingress delivery node, the status information of each value-added service node to a controller; receiving, by the ingress delivery node, a service allocation instruction that is sent by the controller when the controller determines, according to the status information of each value-added service node, that the service chain is in an abnormal running state; and determining, by the ingress delivery node according to the service allocation instruction, that the running state of the service chain is abnormal, where the service allocation instruction includes allocation information of the service chain and allocation information of a redundant service chain of the service chain, and the redundant service chain is determined by the controller according to the status information of each value-added service node.

A second aspect of the present invention provides a service chain management method, including determining a value-added service node that is in an abnormal running state; determining, according to a preset policy library, a service chain on which the value-added service node is located, and acquiring a redundant service chain of the service chain, where the policy library includes at least one policy, each policy includes at least one service chain, and service chains of each policy have a same egress delivery node and a same ingress delivery node; and sending a service allocation instruction to an ingress delivery node corresponding to the redundant service chain, so that the ingress delivery node reconfigures traffic of the service chain and the redundant service chain according to the service allocation instruction.

A third aspect of the present invention provides a service chain management method, including receiving, by a value-added service node on a service chain, a first detection packet for detecting the service chain, where the service chain includes at least one value-added service node, and the first detection packet carries routing information of each value-added service node; and determining, by the value-added service node according to the first detection packet, whether status information of the value-added service node needs to be acquired, and acquiring the status information of the value-added service node when the status information of the value-added service node needs to be acquired; and generating a second detection packet according to the first detection packet and the acquired status information, and sending the second detection packet to a next hop.

In a first possible implementation manner of the third aspect, the first detection packet further carries a collection decision label; and the determining, by the value-added service node according to the first detection packet, whether status information of the value-added service node needs to be acquired includes the determining, by the value-added service node according to the collection decision label, whether the status information of the value-added service node needs to be acquired.

With reference to the first aspect or the first possible implementation manner of the third aspect, in a second possible implementation manner, after the sending, by the value-added service node, the second detection packet to a next hop, the method further includes receiving, by the value-added service node, a fault location packet of the service chain, where the fault location packet carries routing information of each value-added service node; and forwarding, by the value-added service node, the fault location packet to the next hop according to the routing information, and feeding back a fault location reply packet to an ingress delivery node on the service chain, where the fault location reply packet includes status information of at least one node of the value-added service node and a node at the next hop.

With reference to the third aspect or any possible implementation manner of the first to second possible implementation manners of the third aspect, in a third possible implementation manner, the method further includes acquiring, by the value-added service node, the status information of the value-added service node according to a preset detection period; and sending, by the value-added service node, the acquired status information to a controller, so that the controller determines, according to the status information, whether the value-added service node is in a normal running state.

A fourth aspect of the present invention provides a delivery node, where the delivery node is an ingress delivery node on the service chain, and the delivery node includes a packet receiving module configured to receive a detection packet for detecting a service chain, where the service chain includes at least one value-added service node, and the detection packet carries status information of each value-added service node; and a processing module configured to send the status information of each value-added service node to a controller; receive a service allocation instruction that is sent by the controller when the controller determines, according to the status information of each value-added service node, that the service chain is in an abnormal running state; and determine that the running state of the service chain is abnormal according to the service allocation instruction; where the service allocation instruction includes allocation information of the service chain and allocation information of a redundant service chain of the service chain, and the redundant service chain is determined by the controller according to the status information of each value-added service node.

A fifth aspect of the present invention provides a controller, including a detection module configured to determine a value-added service node that is in an abnormal running state; a processing module configured to determine, according to a preset policy library, a service chain on which the value-added service node is located, and acquire a redundant service chain of the service chain, where the policy library includes at least one policy, each policy includes at least one service chain, and service chains of each policy have a same egress delivery node and a same ingress delivery node; and a service allocation instruction sending module configured to send a service allocation instruction to an ingress delivery node corresponding to the redundant service chain, so that the ingress delivery node reconfigures traffic of the service chain and the redundant service chain according to the service allocation instruction.

A sixth aspect of the present invention provides a value-added service node, including a packet receiving module configured to receive a first detection packet for detecting a service chain, where the service chain includes at least one value-added service node, and the first detection packet carries status information of each value-added service node; and a processing module configured to determine, according to the first detection packet, whether status information of the value-added service node needs to be acquired, and acquire the status information of the value-added service node when the status information of the value-added service node needs to be acquired; and generate a second detection packet according to the first detection packet and the acquired status information, and send the second detection packet to a next hop.

In a first possible implementation manner of the sixth aspect, the first detection packet further carries a collection decision label; and when determining whether the status information of the value-added service node needs to be acquired, the processing module is configured to determine, according to the collection decision label, whether the status information of the value-added service node needs to be acquired.

With reference to the sixth aspect or the first possible implementation manner of the sixth aspect, in a second possible implementation manner, the packet receiving module is further configured to receive a fault location packet of the service chain, where the fault location packet carries routing information of each value-added service node; and the processing module is further configured to forward the fault location packet to the next hop according to the routing information, and feed back a fault location reply packet to an ingress delivery node on the service chain, where the fault location reply packet includes status information of at least one node of the value-added service node and a node at the next hop.

With reference to the sixth aspect or any possible implementation manner of the first and second possible implementation manner of the sixth aspect, in a third possible implementation manner, the processing module is further configured to acquire the status information of the value-added service node according to a preset detection period; and send the acquired status information to a controller, so that the controller determines, according to the status information, whether the value-added service node is in a normal running state.

By implementing the present invention, the following beneficial effects are achieved: an ingress delivery node of a service chain can receive a detection packet for detecting the service chain, where the detection packet carries status information of each value-added service node, and the ingress delivery node can determine, according to the detection packet, whether the service chain is in a normal running state. By detection on the service chain, management on the service chain is implemented, thereby improving reliability of the service chain.

BRIEF DESCRIPTION OF DRAWINGS

To describe the technical solutions in the embodiments of the present invention or in the prior art more clearly, the following briefly introduces the accompanying drawings required for describing the embodiments or the prior art.

DESCRIPTION OF EMBODIMENTS

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 1:
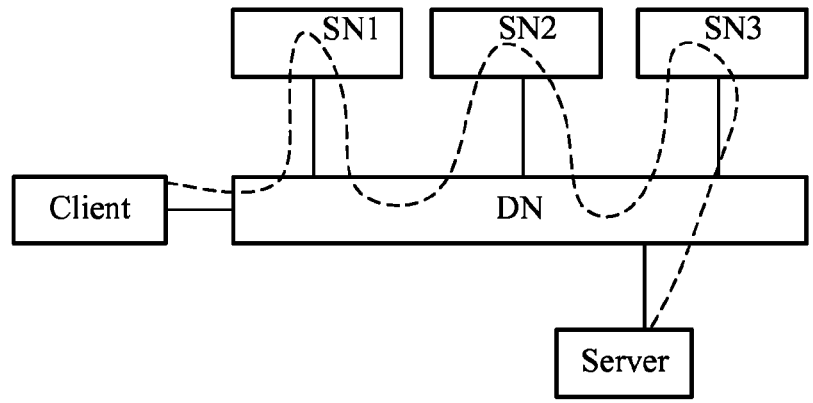
FIG. 1 is a schematic diagram of a service chain according to the prior art.
Figure 2:
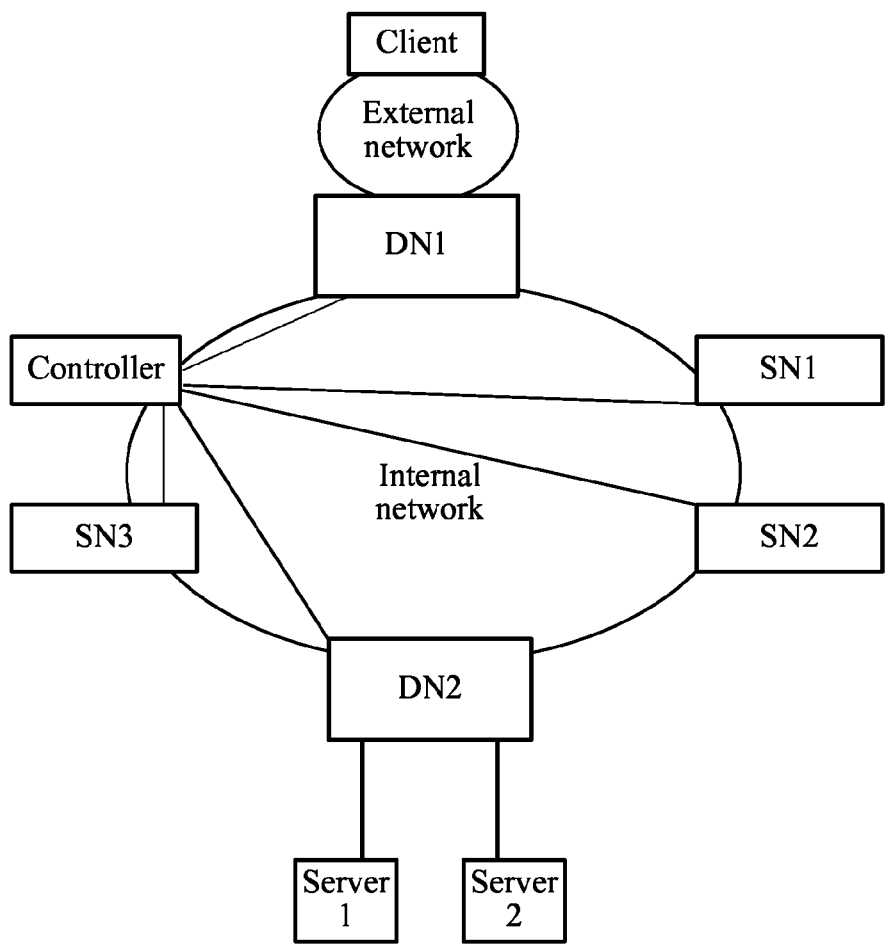
FIG. 2 is a schematic structural diagram of a service chain management system according to an embodiment of the present invention.

A service chain management system provided by an embodiment of the present invention may include a controller, delivery nodes DNs, and value-added service nodes SNs, as shown in FIG. 2, where policies are set in the controller, and as shown in Table 1, each policy includes a correspondence between a service and a service chain, where each service chain includes an ingress delivery node, an egress delivery node, and at least one value-added service node. The controller may deliver a policy to a corresponding ingress delivery node, the ingress delivery node forwards a service flow to a corresponding service chain according to the policy, and the value-added service node on the service chain performs value-added service processing on the service flow. As shown in FIG. 2, a service packet from a client to a server 1 is forwarded by an ingress delivery node DN1 to a service chain for processing. Assuming that value-added service nodes on the service chain include SN1 and SN2, the service packet is sequentially processed by SN1 and SN2 and then forwarded to an egress delivery node DN2, and DN2 then forwards the service packet to the server 1.

TABLE 1

| Policy | Ingress delivery node | Value-added service node | Egress delivery node |
|---|---|---|---|
| Service 1 | DN1 | SN1, SN2 | DN2 |
|  |  | SN1, SN3 | DN2 |
| Service 2 | DN2 | SN1, SN2, SN3 | DN1 |
| . . . | . . . | . . . | . . . |

Service chain management methods provided by the embodiments of the present invention can implement management on a service chain by detecting the service chain, thereby improving reliability of the service chain. The methods are separately described in detail below.

Figure 3:
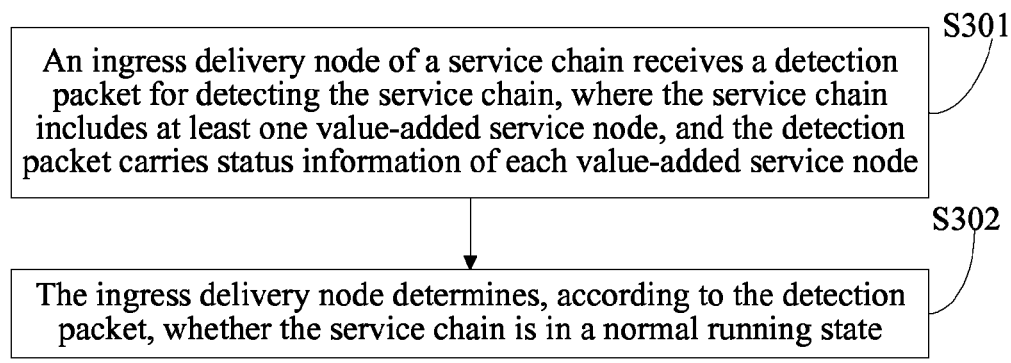
FIG. 3 is a schematic flowchart of a service chain management method according to an embodiment of the present invention.

Referring to FIG. 3, FIG. 3 is a schematic flowchart of a service chain management method according to an embodiment of the present invention. This embodiment of the present invention is described from a perspective of an ingress delivery node. The service chain management method in the embodiment of the present invention shown in FIG. 3 may include the following steps.

S301: An ingress delivery node of a service chain receives a detection packet for detecting the service chain, where the service chain includes at least one value-added service node, and the detection packet carries status information of each value-added service node.

Delivery nodes include an ingress delivery node and an egress delivery node, where the ingress delivery node is configured to send a service packet to a service chain, and the egress delivery node is configured to send, to a destination device, the service packet that is processed by the value-added service node on the service chain. The delivery node may store multiple policies, where each policy may include at least one service chain, and service chains in each policy have a same ingress delivery node and a same egress delivery node. As shown in Table 1, a policy of a service 1 includes two service chains, where one service chain is SN1->SN2, and the other service chain is SN1->SN3, egress delivery nodes of the two service chains are both DN2, and ingress delivery nodes of the two service chains are both DN1.

It is assumed that a format of a packet header of the service packet is defined in Table 2, where Type is a packet type label, for example, Type=240 represents a detection packet, and Type=241 represents a fault location packet. Label is a collection decision label, for example, Label=1 represents a forward detection packet (a direction from the ingress delivery node to the egress delivery node), Label=2 represents a reverse detection packet (that is, a direction from the egress delivery node to the ingress delivery node) and that status information of the value-added service node is not collected, and Label=3 represents a reverse detection packet and that status information of the value-added service node needs to be collected. IP1 and IP2 are routing information of each value-added service node on the service chain, where the packet header may include or not include a collection decision label.

It can be understood that values of Type and Label may be adjusted according to an actual situation, and the present invention is not limited thereto; moreover, the format of the packet header provided in this embodiment of the present invention includes, but is not limited to, a format shown in Table 2.

TABLE 2

| Type | Length | Label | Reserved |
|---|---|---|---|
|  | IP1 |  |  |
|  | IP2 |  |  |
|  | . . . |  |  |

FIG. 2 is used as an example of a schematic diagram of a service chain management system, and SN1->SN3 is used as an example of the service chain.

In this embodiment of the present invention, the detection packet is initiated by the egress delivery node on the service chain. For example, DN2 sends the detection packet, where the detection packet carries routing information of each value-added service node on the service chain; DN2 sends the detection packet to SN3 according to the routing information, and when receiving the detection packet, SN3 may process the detection packet according to any one of the following three manners.

a. SN3 forwards the detection packet according to the routing information. After receiving the detection packet, SN3 acquires the routing information from a header of the detection packet, and sends the detection packet to a next hop according to the routing information, that is, sends the detection packet to SN1, where the packet header of the detection packet is shown in Table 3.

TABLE 3

| Type = 240 | Length = 16 | Reserved |
|---|---|---|
| | SN 2 | |
| | SN 1 | |
| | DN1 | | b. SN3 collects status information of SN3, adds the status information to the detection packet, and sends, to a next hop, the detection packet that carries the status information. After SN3 receives the detection packet, SN3 acquires the routing information from the packet header of the detection packet, acquires status information of SN3, such as traffic load information, adds the acquired status information to the detection packet, and sends, to a next hop according to the acquired routing information, the detection packet that carries the status information, that is, sends the detection packet to SN1. Before SN3 performs processing, the packet header of the detection packet may be a packet header shown in Table 4, and after SN3 performs processing, the packet header of the detection packet may be a packet header shown in Table 5. An Offset field is used to acquire status information of a value-added service node, and represents an offset, with respect to an initial address, corresponding to the status information of the value-added service node, for example, as shown in Table 5, Offset=16 represents that a storage address of the status information of SN3 has an offset of 16 bytes with respect to the initial address.

The status information of the value-added service node is internal information, and therefore, a format of the status information of the value-added service node may be negotiated by the value-added service node and the delivery node.

TABLE 4

| Type = 240 | Length = 16 | Label = 3 | Offset = 0 |
|---|---|---|---|
| | SN 2 | | |
| | SN 1 | | |
| | DN1 | | |

TABLE 5

| Type = 240 | Length = 16 + M | Label = 3 | Offset = 16 |
|---|---|---|---|
| | SN 2 | | |
| | SN 1 | | |
| | DN1 | | |
| | SN3 Status Information, Length: M | | | c. SN3 determines, according to the detection packet, whether to collect status information of SN3, if yes, collects the status information of SN3, adds the status information to the detection packet, and sends, to a next hop, the detection packet that carries the status information; or if no, forwards the detection packet. Preferably, the detection packet may carry a collection decision label, and the value-added service node may determine, according to the collection decision label, whether to collect the status information of SN3; if the collection decision label Label is 2, SN3 does not collect the status information of SN3; and if the collection decision label Label is 3, SN3 collects the status information of SN3; it should be noted that, the value of Label may be changed according an actual situation, and is not limited in the present invention.

When receiving the detection packet sent by SN3, SN1 performs, on the detection packet, an operation the same as that performed by SN3, where the operation is not described in detail herein again; SN1 sends the detection packet to the ingress delivery node DN1; and the ingress delivery node DN1 can receive the detection packet for detecting the service chain. If the detection packet sent by SN1 carries status information of SN1, the packet header of the detection packet sent by SN1 may be shown in Table 6.

TABLE 6

| Type = 240 | Length = 16 + M + N | Label = 3 | Offset = 16 |
|---|---|---|---|
| | SN 2 | | |
| | SN 1 | | |
| | DN1 | | |
| | SN3 Status Information, Length: M | | |
| | SN1 Status Information, Length: N | | |

Preferably, before DN2 sends the detection packet, DN1 may send a notification packet for detecting the service chain, where the notification packet carries routing information of each value-added service node on the service chain, and a packet header of the notification packet is shown in Table 7; each value-added service node that receives the notification packet directly forwards the notification packet, and when the egress delivery node DN2 receives the notification packet sent by SN3, DN2 generates the detection packet and sends the detection packet to SN3.

TABLE 7

| Type = 240 | Length = 16 | Label = 1 | Reserved |
|---|---|---|---|
| | SN 1 | | |
| | SN 3 | | |
| | DN2 | | |

Optionally, DN2 may directly send the detection packet.

S302: The ingress delivery node determines, according to the detection packet, whether the service chain is in a normal running state.

As an optional implementation manner, when receiving the detection packet, the ingress delivery node may determine that the service chain is in a normal running state. Regardless of whether the detection packet carries the status information of each value-added service node, when receiving the detection packet, the ingress delivery node may determine that the service chain is in a normal running state.

As another optional implementation manner, if the detection packet carries the status information of each value-added service node, when the ingress delivery node receives the detection packet, the ingress delivery node may acquire the status information carried in the detection packet, and send the acquired status information to a controller, so that the controller determines, according to the status information of each value-added service node, whether the service chain is in a normal running state.

If the controller determines, according to the status information of each value-added service node, that the service chain is in an abnormal running state, for example, the controller may determine that the service chain is in an abnormal running state when the controller detects that traffic of a value-added service node exceeds a traffic limit, the controller sends a service allocation instruction to the ingress delivery node; after receiving the service allocation instruction sent by the controller, the ingress delivery node determines, according to the service allocation instruction, that the service chain is in an abnormal running state, and further reconfigures traffic of the service chain and a redundant service chain according to the service allocation instruction. For example, by using the service chain SN1->SN3 as an example, the redundant service chain of the service chain is SN1->SN2, and the ingress delivery node may control, according to the service allocation instruction, a ratio between traffic of the service 1 passing through SN3 and SN2, for example, SN3 processes 70% of the traffic of the service 1, and SN2 processes 30% of the traffic of the service 1. In this implementation manner, the ingress delivery node may reconfigure the traffic of the service chain according to the service allocation instruction, which alleviates the burden of a heavily loaded value-added service node, thereby improving reliability of the service chain.

If the ingress delivery node does not receive the service allocation instruction sent by the controller, the ingress delivery node determines that the service chain is in a normal running state.

In the embodiment shown in FIG. 3, an ingress delivery node receives a detection packet for detecting a service chain, and determines, according to the detection packet, whether the service chain is in a normal running state, where the ingress delivery node may determine, when receiving the detection packet, that the service chain is in a normal running state; if the detection packet carries status information of each value-added service node, the ingress delivery node may send the status information to a controller, so that the controller determines, according to the status information of each value-added service node, whether the service chain is in a normal running state. In this embodiment, by detecting a running status of a service chain, management on the service chain is implemented, thereby improving reliability of the service chain.

Figure 4:
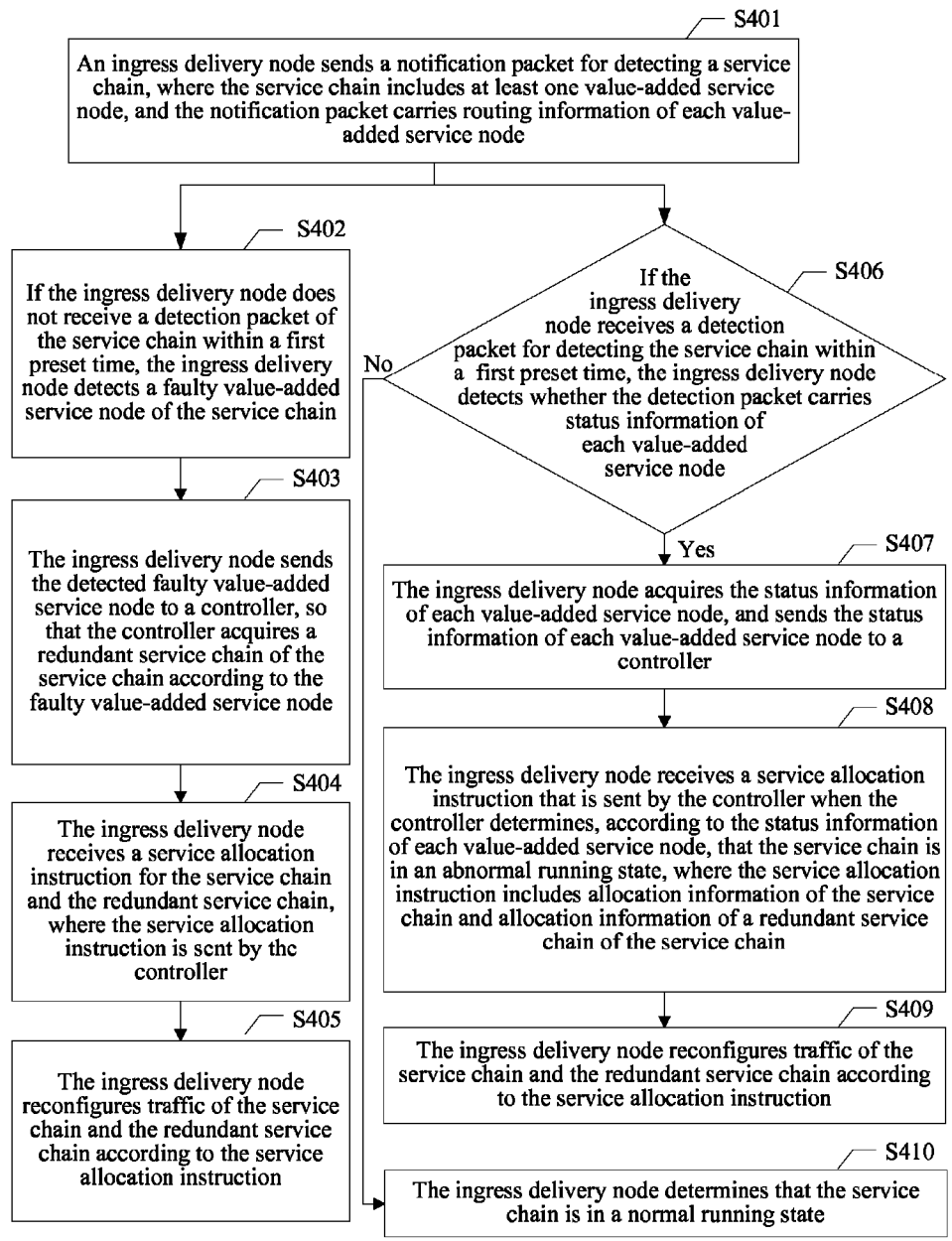
FIG. 4 is a schematic flowchart of another service chain management method according to an embodiment of the present invention.

Referring to FIG. 4, FIG. 4 is a schematic flowchart of another service chain management method according to an embodiment of the present invention. This embodiment of the present invention is described from a perspective of an ingress delivery node. The service chain management method in the embodiment of the present invention shown in FIG. 4 may include the following steps.

S401: An ingress delivery node sends a notification packet for detecting a service chain, where the service chain includes at least one value-added service node, and the notification packet carries routing information of each value-added service node.

FIG. 2 is used as an example of a service chain management system, and SN1->SN3 is used as an example of the service chain.

The ingress delivery node DN1 may periodically send the notification packet for detecting the service chain, where the notification packet carries routing information of each value-added service node, and a packet header of the notification packet may be shown in Table 7. When SN1 receives the notification packet, SN1 may determine, according to the packet header of the packet, that the packet is a notification packet, and forwards the notification packet to a next hop, that is, SN3, according to the routing information. After receiving the notification packet, SN3 performs an operation the same as that performed by SN1, and forwards the notification packet to the egress delivery node DN2. After receiving the notification packet sent by SN3, DN2 sends a detection packet according to the notification packet.

It should be noted that, in this embodiment of the present invention, DN1 periodically sends the notification packet, and DN2 sends the detection packet only when DN2 receives the notification packet. In another optional embodiment, DN2 may directly and periodically send the detection packet.

S402: If the ingress delivery node does not receive a detection packet for detecting the service chain within a first preset time, the ingress delivery node detects a faulty value-added service node on the service chain.

DN1 starts timing when sending the notification packet for detecting the service chain, and if DN1 does not receive the detection packet for detecting the service chain within the first preset time, for example, if DN1 cannot receive the detection packet for detecting the service chain because a value-added service node n the service chain is faulty or a line between value-added service nodes is faulty, DN1 may determine that the service chain is in an abnormal running state, and detect a faulty value-added service node on the service chain.

DN1 may send, to the service chain, a fault location packet for detecting the service chain, where the fault location packet carries routing information of each value-added service node, so that each value-added service node that receives the fault location packet feeds back a fault location reply packet according to the fault location packet; and DN1 then determines a faulty value-added service node according to the received fault location reply packet.

Preferably, a packet header of the fault location packet may be shown in Table 8. DN1 may send the fault location packet to SN1 according to the routing information, and SN1 may determine, according to a packet type Type=241, that the packet is a fault location packet. On one hand, SN1 acquires status information of SN1, generates a fault location reply packet including the status information of SN1, and feeds back the fault location reply packet to DN1. On the other hand, SN1 sends the received fault location packet to a next hop, that is, SN3, so that SN3 may feed back a fault location reply packet according to the fault location packet.

TABLE 8

| Type = 241 | Length = 16 | Label = 1 | Reserved |
|---|---|---|---|
| | SN 1 | | |
| | SN3 | | |
| | DN2 | | |

Optionally, when acquiring the status information of SN1, SN1 may further detect whether a next value-added service node is normal, and if it is detected that the next value-added service node SN3 is abnormal, for example, the next hop is unreachable, SN1 may add, to the fault location reply packet, detected status information of the next value-added service node, where a packet header of the fault location reply packet may be shown in Table 9. DN1 may determine the faulty value-added service node according to the status information of each value-added service node that receives the fault location reply packet, for example, when the packet header of the received fault location reply packet is a packet header shown in Table 9, DN1 may use SN3 as the faulty value-added service node.

TABLE 9

| Type = 241 | Length = 16 + M + N | Label = 3 | Offset = 16 |
|---|---|---|---|
| | SN 1 | | |
| | SN 3 | | |
| | DN2 | | |
| | SN1: OK, Length: M | | |
| | SN3: failed, Length: N | | |

It can be understood that, the service chain may include multiple value-added service nodes, and a fault location reply packet fed back to the ingress delivery node by a value-added service node that is not directly connected to the ingress delivery node is forwarded by another value-added service node, for example, when SN3 sends a fault location reply packet, SN3 first sends the fault location reply packet to SN1, and when receiving the fault location reply packet, SN1 may determine, according to the packet header of the packet, that the packet is a fault location reply packet, and SN1 forwards the fault location reply packet to DN1.

Further optionally, DN1 may set a time when sending the fault location packet, and if a fault location reply packet of a value-added service node is not received within a second preset time, DN1 determines that the value-added service node is a faulty value-added service node, for example, if DN1 does not receive a fault location reply packet of SN3 within the second preset time, DN1 may determine that SN3 is the faulty value-added service node.

S403: The ingress delivery node sends the detected faulty value-added service node to a controller, so that the controller acquires a redundant service chain of the service chain according to the faulty value-added service node.

When the ingress delivery node detects the faulty value-added service node, the ingress delivery node may send the detected faulty value-added service node to the controller, and the controller may query a preset policy library to determine all service chains on which the faulty value-added service node is located. For each service chain, the controller acquires a redundant service chain of the service chain, determines, according to status information of each value-added service node on the service chain and on the redundant service chain of the service chain, a service allocation instruction of a service corresponding to the service chain, and deliver the service allocation instruction to a corresponding ingress delivery node of the service chain and the redundant service chain.

S404: The ingress delivery node receives a service allocation instruction for the service chain and the redundant service chain, where the service allocation instruction is sent by the controller.

S405: The ingress delivery node reconfigures traffic of the service chain and the redundant service chain according to the service allocation instruction.

When receiving the service allocation instruction for the service chain and the redundant service chain, where the service allocation instruction is sent by the controller, the ingress delivery node reconfigures traffic of the service chain and the redundant service chain according to the service allocation instruction, for example, if SN3 is faulty and SN3 bears 100% of traffic before being faulty, after traffic of the service chain and the redundant service chain is reconfigured, all the traffic borne by SN3 may be loaded to the redundant service chain, that is SN3 bears 0% of the traffic, and SN2 bears 100% of the traffic.

S406: If the ingress delivery node receives a detection packet for detecting the service chain within a first preset time, the ingress delivery node detects whether the detection packet carries status information of each value-added service node.

Preferably, the ingress delivery node may determine, according to a packet header of the detection packet, whether the detection packet carries the status information of each value-added service node, and if yes, the ingress delivery node reads the status information of each value-added service node; or if the detection packet does not carry status information of any value-added service node, it is determined that the service chain is in a normal running state.

Optionally, the ingress delivery node may further traverse the detection packet, to detect whether the detection packet carries the status information of each value-added service node.

It should be noted that, in this embodiment of the present invention, if the ingress delivery node receives the detection packet for detecting the service chain within the first preset time, the ingress delivery node further detects whether the detection packet carries the status information of each value-added service node. In another optional embodiment, when receiving the detection packet for detecting the service chain, the ingress delivery node may determine that the service chain is in a normal running state.

S407: If yes, the ingress delivery node acquires the status information of each value-added service node, and sends the status information of each value-added service node to a controller.

The ingress delivery node may read status information of the first value-added service node according to Offset, that is, an offset with respect to an initial address, read status information of the second value-added service node according to a length of the first value-added service node and Offset, and keep reading status information until finishing reading status information of all the value-added service nodes. The value-added service node sends the acquired status information to the controller, so that the controller determines, according to the status information of each value-added service node, whether the value-added service node is in a normal running state.

If the controller determines, according to the status information of each value-added service node, that the service chain is in an abnormal running state, for example, the controller detects that traffic of a value-added service node exceeds a traffic limit, the controller may determine that the service chain is in an abnormal running state.

S408: The ingress delivery node receives a service allocation instruction that is sent by the controller when the controller determines, according to the status information of each value-added service node, that the service chain is in an abnormal running state, where the service allocation instruction includes allocation information of the service chain and allocation information of a redundant service chain of the service chain.

After sending the status information of each value-added service node in the detection packet to the controller, if the ingress delivery node receives a service allocation instruction sent by the controller, the ingress delivery node may determine that the service chain is in an abnormal running state.

S409: The ingress delivery node reconfigures traffic of the service chain and the redundant service chain according to the service allocation instruction.

When the ingress delivery node receives the service allocation instruction sent by the controller, the ingress delivery node reconfigures traffic of the service chain and the redundant service chain according to the service allocation instruction, for example, SN1->SN3 is used as an example of the service chain, SN1->SN2 is used as an example of the redundant service chain of the service chain, and the ingress delivery node may control, according to the service allocation instruction, a ratio between traffic passing through SN3 and SN2, for example, SN3 processes 70% of the traffic, and SN2 processes 30% of the traffic; the ingress delivery node may reconfigure the traffic of the service chain according to the service allocation instruction, which alleviates the burden of a heavily loaded value-added service node, thereby improving reliability of the service chain.

S410: If no, the ingress delivery node determines that the service chain is in a normal running state.

In the embodiment shown in FIG. 4, an ingress delivery node may send a notification packet for detecting a service chain; if the ingress delivery node does not receive a detection packet for detecting the service chain within a first preset time, the ingress delivery node determines that the service chain is in an abnormal running state, and further locates a faulty value-added service node on the service chain and sends the faulty value-added service node to a controller; and when receiving a service allocation instruction for the service chain and a redundant service chain, where the service allocation instruction is sent by the controller, the ingress delivery node reconfigures traffic of the service chain and the redundant service chain according to the service allocation instruction.

If the ingress delivery node receives the detection packet for detecting the service chain within the first preset time, the ingress delivery node detects whether the detection packet carries status information of each value-added service node; if yes, the ingress delivery node sends the status information of each value-added service node to the controller, so that the controller determines, according to the status information of each value-added service node, whether the service chain is in a normal running state; or if no, the ingress delivery node directly determines that the service chain is in a normal running state. By means of detection, fault location, and service recovery on the service chain, management of the service chain is implemented, thereby improving reliability of the service chain.

Figure 5:
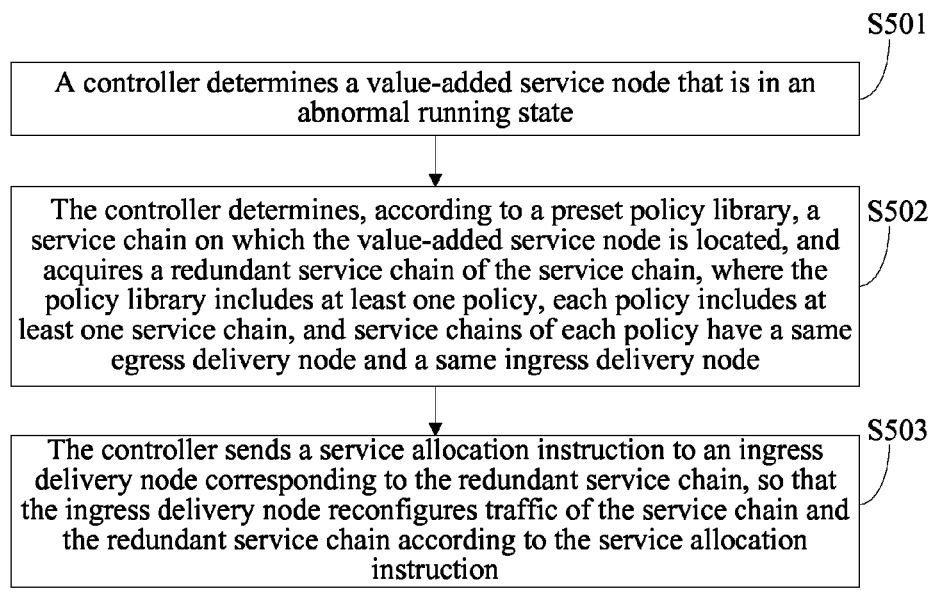
FIG. 5 is a schematic flowchart of still another service chain management method according to an embodiment of the present invention.

Referring to FIG. 5, FIG. 5 is a schematic flowchart of still another service chain management method according to an embodiment of the present invention. This embodiment of the present invention is described from a perspective of a controller. The service chain management method in the embodiment of the present invention shown in FIG. 5 may include the following steps.

S501: A controller determines a value-added service node that is in an abnormal running state.

As an optional implementation manner, the controller may acquire status information of a value-added service node, and determine, according to the status information, that the value-added service node is in an abnormal running state.

Preferably, the controller may receive status information of a value-added service node sent by an ingress delivery node, and determine, according to the status information, that the value-added service node is in an abnormal running state.

In specific implementation, the ingress delivery node on the service chain may send a notification packet, and when an egress delivery node on the service chain receives the notification packet, the egress delivery node sends a detection packet for detecting the service chain.

The egress delivery node on the service chain may also directly send the detection packet for detecting the service chain. A packet header of the detection packet may be shown in Table 4; when receiving the detection packet, the ingress delivery node on the service chain may acquire status information of a value-added service node carried in the detection packet, and sends the status information to the controller. The controller can therefore receive the status information of the value-added service node sent by the ingress delivery node.

Optionally, the controller may receive status information sent by a value-added service node, and determines, according to the status information, that the value-added service node is in an abnormal running state.

During specific implementation, the value-added service node on the service chain may periodically feed back status information; by using SN1 as an example, SN1 may acquire status information of SN1, and directly send the acquired status information to the controller.

SN1 may further detect a next value-added service node, and if status information of the next value-added service node can be detected, for example, if a next hop is unreachable, SN1 may further send the status information of the next hop to the controller, and the controller can therefore receive the status information of the value-added service node sent by the ingress delivery node.

As another optional implementation manner, the controller may receive a notification packet sent by the ingress delivery node, where the notification packet carries information about a value-added service node, and determine, according to the notification packet, the value-added service node as the value-added service node that is in an abnormal running state, that is, a faulty value-added service node.

In specific implementation, the ingress delivery node on the service chain may send a notification packet for detecting the service chain, and if the ingress delivery node does not receive a detection packet for detecting the service chain within a first preset time, the ingress delivery node determines that the service chain is in an abnormal running state, sends a fault location packet of the service chain, and determines a faulty value-added service node according to a fault location reply packet fed back by each value-added service node on the service chain; then, the ingress delivery node may send the faulty value-added service node to the controller by using the notification packet, and the controller may determine, according to the received notification packet, a value-added service node that is on the service chain and in an abnormal running state.

S502: The controller determines, according to a preset policy library, a service chain on which the value-added service node is located, and acquires a redundant service chain of the service chain, where the policy library includes at least one policy, each policy includes at least one service chain, and service chains of each policy have a same egress delivery node and a same ingress delivery node.

The policy library may be shown in Table 1, and when the controller determines a value-added service node that is in an abnormal running state, the controller determines all service chains on which the value-added service node is located, and acquires a redundant service chain corresponding to each service chain. A processing procedure performed by the controller on the service chain is merely one of procedures; the controller needs to determine the redundant service chain corresponding to each service chain on which the value-added service node is located, and then delivers a service allocation instruction to an ingress delivery node corresponding to the redundant service chain.

S503: The controller sends a service allocation instruction to an ingress delivery node corresponding to the redundant service chain, so that the ingress delivery node reconfigures traffic of the service chain and the redundant service chain according to the service allocation instruction.

If the controller determines, by acquiring status information of each value-added service node on the service chain, that the service chain is in an abnormal running state, the controller may allocate traffic to the redundant service chain of the service chain according to status information of a value-added service node that is in an abnormal running state on the service chain, that is, make the redundant service chain of the service chain share some traffic of the service chain; the controller may send a service allocation instruction to an ingress delivery node corresponding to the redundant service chain, so that the ingress delivery node reconfigures, traffic of the service chain and the redundant service chain according to the service allocation instruction, so as to alleviate the burden of the service chain, thereby improving reliability of the service chain.

It can be understood that, a volume of traffic that the controller controls the redundant service chain to share may be calculated according to an excess traffic part of the corresponding faulty value-added service node.

If the controller determines, according to the notification packet sent by the ingress delivery node, that the service chain is in an abnormal running state, the controller may allocate all traffic of the service chain, to the redundant service chain of the service chain for processing, that is, make the service chain share 0% of the traffic, and make the redundant service chain of the service chain share 100% of the traffic, so that the service of the service chain is not interrupted, thereby improving reliability of the service chain.

In the embodiment shown in FIG. 5, a controller may determine a value-added service node that is in an abnormal running state, determine a service chain on which the value-added service node is located, acquire a redundant service chain corresponding to the service chain, and then deliver a service allocation instruction to an ingress delivery node in a policy, so that the ingress delivery node reconfigures traffic of the corresponding service chain according to the received service allocation instruction; by means of detection, fault location, and service recovery on the service chain, management on the service chain is implemented, thereby improving reliability of the service chain.

Figure 6:
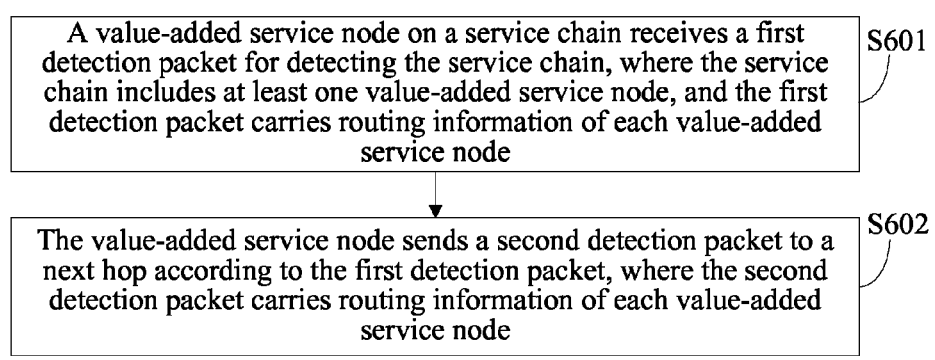
FIG. 6 is a schematic flowchart of still another service chain management method according to an embodiment of the present invention.

Referring to FIG. 6, FIG. 6 is a schematic flowchart of still another service chain management method according to an embodiment of the present invention. This embodiment of the present invention is described from a perspective of a value-added service node. The service chain management method in the embodiment of the present invention shown in FIG. 6 may include the following steps.

S601: A value-added service node on a service chain receives a first detection packet for detecting the service chain, where the service chain includes at least one value-added service node, and the first detection packet carries routing information of each value-added service node.

FIG. 2 is used as an example of a schematic diagram of a service chain management system, and SN1->SN3 is used as an example of the service chain, where the service chain includes two value-added service nodes, and for ease of description, this embodiment of the present invention is described from a perspective of SN3.

Optionally, before receiving the first detection packet for detecting the service chain, SN3 may further receive a notification packet for detecting the service chain, where the notification packet carries routing information of each value-added service node, and SN3 forwards the notification packet to a next hop according to the routing information, so that an egress delivery node on the service chain sends the detection packet when receiving the notification packet.

It can be understood that, the first detection packet received by SN3 is a detection packet that is sent by DN2 when DN2 receives the notification packet, and if SN3 is not directly connected to DN2, the first detection packet received by SN3 is a detection packet that is sent by DN2 after receiving the notification packet and forwarded.

The ingress delivery node DN1 of the service chain may send a notification packet; when receiving the notification packet, SN1 determines, according to a packet header of the packet, that the packet is a notification packet, and sends the notification packet to SN3 according to routing information; SN3 performs an operation the same as that performed by SN1, and sends the notification packet to DN2; and when receiving the notification packet, DN2 sends the first detection packet.

S602: The value-added service node sends a second detection packet to a next hop according to the first detection packet, where the second detection packet carries routing information of each value-added service node.

When receiving the first detection packet, SN3 may process the first detection packet according to any one of the following three manners.

a. According to the routing information of the first detection packet, SN3 sends the first detection packet to the next hop as the second detection packet. After receiving the first detection packet sent by DN2, SN3 acquires the routing information from a header of the first detection packet, and sends a newly generated second detection packet to the next hop according to the routing information, that is, sends the second detection packet to SN1, where packet headers of the first detection packet and the second detection packet are as shown in Table 3.

b. SN3 acquires status information of SN3, generates a second detection packet, and sends, to the next hop, the second detection packet that carries the status information. After receiving the first detection packet, SN3 acquires the routing information from the header of the first detection packet, acquires status information of SN3, such as traffic load information, generates a second detection packet, and sends, to the next hop according to the acquired routing information, the second detection packet that carries the status information, that is, sends the second detection packet to SN1, where the packet header of the first detection packet may be shown in Table 4, and the packet header of the second detection packet may be shown in Table 5. An Offset field is used to acquire status information of a value-added service node, and represents an offset, with respect to an initial address, corresponding to the status information of the value-added service node, for example, as shown in Table 5, Offset=16 represents that a storage address of the status information of SN3 has an offset of 16 bytes with respect to the initial address.

The status information of the value-added service node is internal information, and therefore, a format of the status information of the value-added service node may be negotiated by the value-added service node and the delivery node.

c. SN3 determines, according to the first detection packet, whether status information of SN3 needs to be acquired; if yes, SN3 acquires the status information of SN3, generates a second detection packet according to the first detection packet and the acquired status information, where the second detection packet carries the acquired status information, and sends, to the next hop, the second detection packet that carries the status information; or if no, SN3 sends the first detection packet to the next hop as the second detection packet.

Preferably, the first detection packet may carry a collection decision label, and SN3 may determine, according to the collection decision label, whether to collect the status information of SN3; if the collection decision label Label is 2, SN3 does not collect the status information of SN3; and if the collection decision label Label is 3, SN3 collects the status information of SN3; it should be noted that, the value of Label may be changed according an actual situation, and is not limited in the present invention.

After receiving the second detection packet sent by SN3, SN1 performs an operation the same as that performed by SN3, where the operation is not described in detail herein again, and SN1 then sends a third detection packet to the ingress delivery node DN1; and DN1 can receive the detection packet for detecting the service chain. If the third detection packet sent by SN1 carries status information of SN1, a packet header of the third detection packet sent by SN1 may be shown in Table 7.

Further, after sending the second detection packet to the next hop according to the first detection packet, SN3 may further receive a fault location packet of the service chain, where the fault location packet carries routing information of each value-added service node, and SN3 forwards the fault location packet to the next hop according to the routing information, and feeds back a fault location reply packet to the ingress delivery node on the service chain, where the fault location reply packet carries information about a route to the ingress delivery node, and the fault location reply packet carries status information of at least one node of SN3 and a node at the next hop.

Preferably, a packet header of the fault location packet may be shown in Table 8, and SN1 may receive the fault location packet sent by DN1. On one hand, SN1 acquires status information of SN1, generates a fault location reply packet that includes the status information of SN1 and feeds back the fault location reply packet to DN1, and on the other hand, SN1 sends the received fault location packet to a next hop, that is, SN3, so that SN3 may receive the fault location packet of the service chain, and feeds back a fault location reply packet to DN1 of the service chain.

Optionally, when acquiring the status information of SN1, SN1 may further detect whether a next value-added service node is normal, and if it is detected that the next value-added service node SN3 is abnormal, for example, the next hop is unreachable, SN1 may also add, to the fault location reply packet, detected status information of the next value-added service node, where a packet header of the fault location reply packet may be shown in Table 9. DN1 may determine the faulty value-added service node according to the status information of each value-added service node that receives the fault location reply packet, for example, when the packet header of the received fault location reply packet is shown in Table 9, DN1 may use SN3 as the faulty value-added service node.

It can be understood that, the service chain may include multiple value-added service nodes, and a fault location reply packet fed back to the ingress delivery node by a value-added service node that is not directly connected to the ingress delivery node is forwarded by another value-added service node, for example, when SN3 sends a fault location reply packet, SN3 first sends the fault location reply packet to SN1, and when receiving the fault location reply packet, SN1 may determine, according to the packet header of the packet, that the packet is a fault location reply packet, and SN1 forwards the fault location reply packet to DN1.

Further, SN3 may acquire the status information of SN3 according to a preset detection period, and send the acquired status information to the controller, so that the controller determines, according to the status information, whether the value-added service node is in a normal running state.

In the embodiment shown in FIG. 6, a value-added service node may receive a first detection packet for detecting a service chain, and send a second detection packet to a next hop according to the first detection packet, so that when receiving a detection packet for detecting the service chain, an ingress delivery node on the service chain may determine, according to the detection packet, whether the service chain is in a normal running state, thereby implementing management on the service chain, and improving reliability of the service chain.

Figure 7:
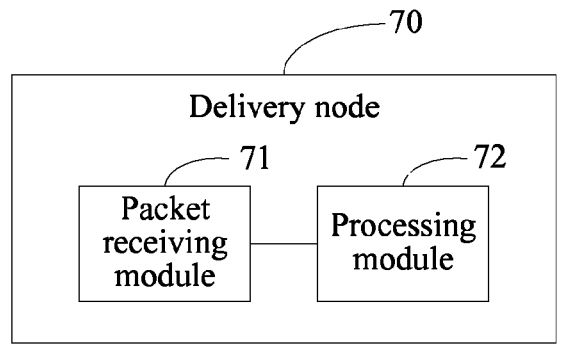
FIG. 7 is a schematic structural diagram of a delivery node according to an embodiment of the present invention.

Referring to FIG. 7, FIG. 7 is a schematic structural diagram of a delivery node according to an embodiment of the present invention. The delivery node is an ingress delivery node on the service chain. As shown in FIG. 7, a delivery node 70 of this embodiment of the present invention may include at least a packet receiving module 71 and a processing module 72, where the packet receiving module 71 is configured to receive a detection packet for detecting a service chain, where the service chain includes at least one value-added service node, and the detection packet carries status information of each value-added service node; and the processing module 72 is configured to determine, according to the detection packet, whether the service chain is in a normal running state.

In an optional implementation manner, the processing module 72 may be configured to send the status information of each value-added service node to a controller; receive a service allocation instruction that is sent by the controller when the controller determines, according to the status information of each value-added service node, that the service chain is in an abnormal running state; and determine that the running state of the service chain is abnormal according to the service allocation instruction, where the service allocation instruction includes allocation information of the service chain and allocation information of a redundant service chain of the service chain, and the redundant service chain is determined by the controller according to the status information of each value-added service node.

In another optional implementation manner, when the packet receiving module 71 receives the detection packet, the processing module 72 may determine that the service chain is in a normal running state. Regardless of whether the detection packet carries the status information of each value-added service node or not, when the packet receiving module 71 receives the detection packet, the processing module 72 may determine that the service chain is in a normal running state.

Further, the processing module 72 may be configured to reconfigure traffic of the service chain and the redundant service chain according to the service allocation instruction.

Figure 8:
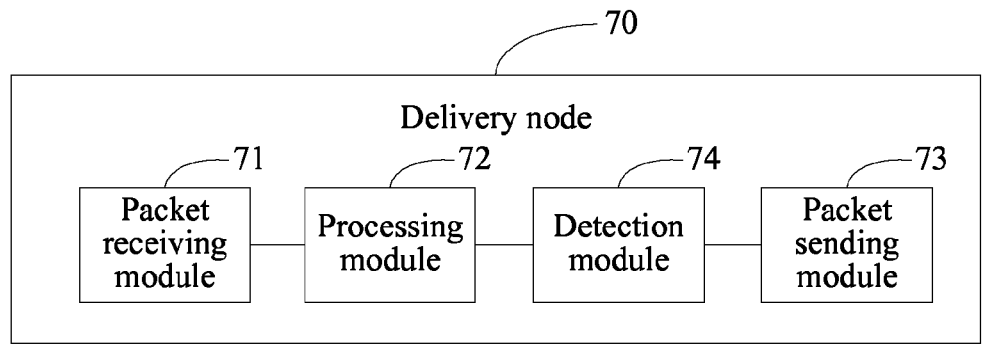
FIG. 8 is a schematic structural diagram of another delivery node according to an embodiment of the present invention.

As shown in FIG. 8, which is a schematic structural diagram of another delivery node according to an embodiment of the present invention, the delivery node 70 may further include a packet sending module 73, where the packet sending module 73 is configured to send a notification packet for detecting the service chain, and the notification packet carries routing information of each value-added service node.

The packet sending module 73 sends a notification packet for detecting the service chain, where a packet header of the notification packet is shown in Table 7; each value-added service node that receives the notification packet directly forwards the notification packet, and when an egress delivery node on the service chain receives the notification packet, the egress delivery node generates the detection packet and sends the detection packet to the service chain, so that the packet receiving module 71 can receive the detection packet for detecting the service chain.

Optionally, the egress delivery node on the service chain may also directly send the detection packet, so that the packet receiving module 71 can receive the detection packet for detecting the service chain.

Further, as shown in FIG. 8, which is a schematic structural diagram of another delivery node according to an embodiment of the present invention, the delivery node 70 may further include a detection module 74, where the detection module 74 is configured to, after the packet sending module 73 sends the notification packet for detecting the service chain, if the packet receiving module 71 does not receive the detection packet within a first preset time, detect a faulty value-added service node on the service chain.

Further, the processing module 72 is configured to send the detected faulty value-added service node to the controller, so that the controller acquires a redundant service chain of the service chain according to the faulty value-added service node; receive a service allocation instruction for the service chain and the redundant service chain, where the service allocation instruction is sent by the controller; and reconfigure traffic of the service chain and the redundant service chain according to the service allocation instruction.

Figure 9:
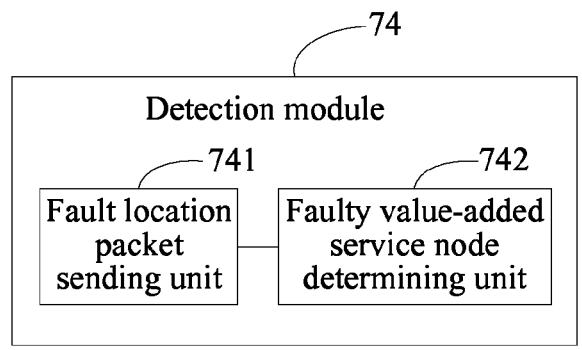
FIG. 9 is a schematic structural diagram of a detection module according to an embodiment of the present invention.

As shown in FIG. 9, which is a schematic structural diagram of a detection module according to an embodiment of the present invention, the detection module 74 may include a fault location packet sending unit 741 and a faulty value-added service node determining unit 742, where the fault location packet sending unit 741 is configured to send a fault location packet to the service chain, where the fault location packet carries routing information of each value-added service node, so that each value-added service node that receives the fault location packet feeds back a fault location reply packet according to the fault location packet; and the faulty value-added service node determining unit 742 is configured to determine the faulty value-added service node according to the received fault location reply packet.

In an optional implementation manner, the fault location reply packet carries status information of a value-added service node, and the faulty value-added service node determining unit 742 may be configured to determine the faulty value-added service node according to the status information of the value-added service node carried in the fault location reply packet.

In another optional implementation manner, if the faulty value-added service node determining unit 742 does not receive, in a first preset time, a fault location reply packet fed back by a target value-added service node, the faulty value-added service node determining unit 742 uses the target value-added service node as the faulty value-added service node.

It can be understood that, functions of functional modules of the delivery node 70 in this embodiment may be implemented according to the methods in the foregoing method embodiments, reference may be made to related descriptions of the method embodiments in FIG. 3 to FIG. 6, and details are not described herein again.

Figure 10:
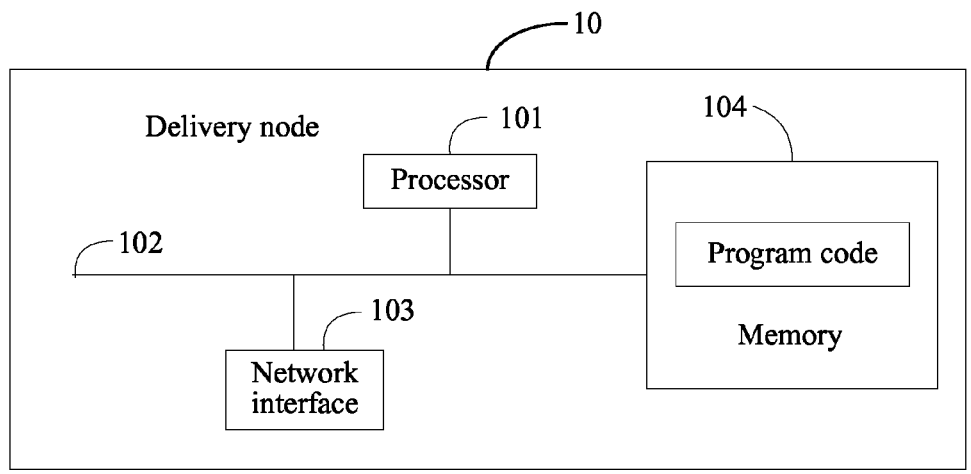
FIG. 10 is a schematic structural diagram of still another delivery node according to an embodiment of the present invention.

Referring to FIG. 10, FIG. 10 is a schematic structural diagram of still another delivery node according to an embodiment of the present invention, where the delivery node is an ingress delivery node of a service chain. As shown in FIG. 10, the delivery node 10 may include at least one processor 101, for example, a central processing unit (CPU), at least one communications bus 102, a network interface 103, and a memory 104. The network interface 103 is configured to send and receive packets; and the communications bus 102 is configured to implement connections and communication among these components. The memory 104 may be a high-speed random-access memory (RAM), or may be a non-volatile memory, for example, at least one magnetic disk memory. The memory 104 has stored a group of program code, and the processor 101 is configured to invoke the program code stored in the memory 104, to perform the method shown in FIG. 3 or FIG. 4.

Figure 11:
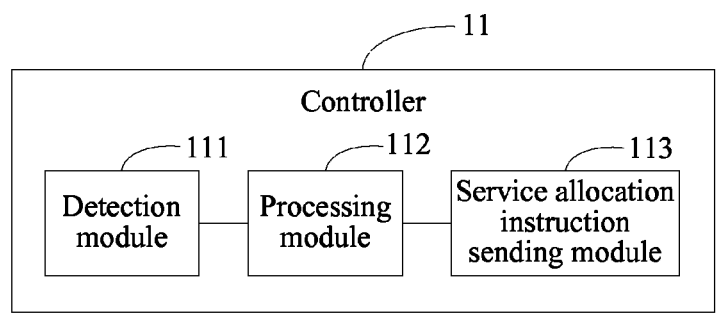
FIG. 11 is a schematic structural diagram of a controller according to an embodiment of the present invention.

Referring to FIG. 11, FIG. 11 is a schematic structural diagram of a controller according to an embodiment of the present invention. As shown in FIG. 11, a controller 11 in this embodiment of the present invention may include at least a detection module 111, a processing module 112, and a service allocation instruction sending module 113, where the detection module 111 is configured to determine a value-added service node that is in an abnormal running state.

Figure 12:
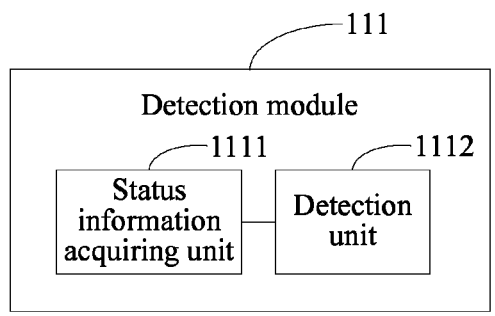
FIG. 12 is a schematic structural diagram of a detection module according to an embodiment of the present invention.

As an optional implementation manner, the detection module 111 may further include a status information acquiring unit 1111 and a detection unit 1112, as shown in FIG. 12, where the status information acquiring unit 1111 is configured to acquire status information of the value-added service node; and the detection unit 1112 is configured to determine, according to the acquired status information, that the value-added service node is in an abnormal running state.

The status information acquiring unit 1111 may be configured to receive the status information of the value-added service node sent by the ingress delivery node; or receive the status information of the value-added service node sent by the value-added service node.

As another optional implementation manner, the detection module 111 may be configured to receive a notification packet sent by the ingress delivery node, where the notification packet carries information about the value-added service node; and determine, according to the notification packet, the value-added service node as the value-added service node that is in an abnormal running state.

The processing module 112 is configured to determine, according to a preset policy library, a service chain on which the value-added service node is located, and acquire a redundant service chain of the service chain, where the policy library includes at least one policy, each policy includes at least one service chain, and service chains of each policy have a same egress delivery node and a same ingress delivery node.

The service allocation instruction sending module 113 is configured to send a service allocation instruction to an ingress delivery node corresponding to the redundant service chain, so that the ingress delivery node reconfigures traffic of the service chain and the redundant service chain according to the service allocation instruction.

It can be understood that, functions of functional modules of the controller 11 in this embodiment may be implemented according to the methods in the foregoing method embodiments, reference may be made to related descriptions of the method embodiments in FIG. 3 to FIG. 6, and details are not described herein again.

Figure 13:
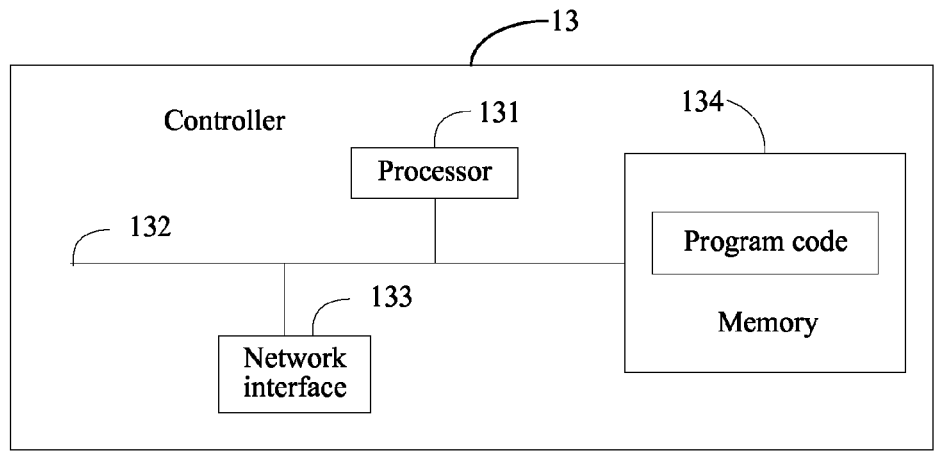
FIG. 13 is a schematic structural diagram of another controller according to an embodiment of the present invention.

Referring to FIG. 13, FIG. 13 is a schematic structural diagram of another controller according to an embodiment of the present invention, and as shown in FIG. 13, a controller 13 may include at least one processor 131, such as a CPU, at least one communications bus 132, a network interface 133, and a memory 134. The network interface 133 is configured to send and receive packets; and the communications bus 132 is configured to implement connections and communication among these components. The memory 134 may be a high-speed RAM memory, or may be a non-volatile memory, for example, at least one magnetic disk memory. The memory 134 has stored a group of program code, and the processor 131 is configured to invoke the program code stored in the memory 134, to perform the method shown in FIG. 5.

Figure 14:
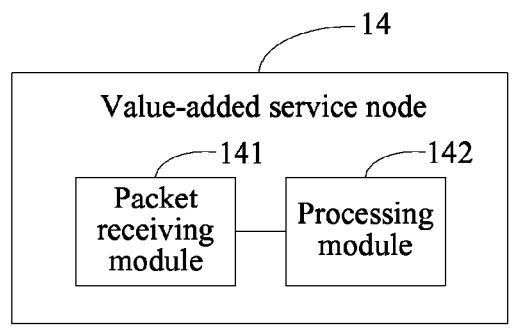
FIG. 14 is a schematic structural diagram of a value-added service node according to an embodiment of the present invention.

Referring to FIG. 14, FIG. 14 is a schematic structural diagram of a value-added service node according to an embodiment of the present invention. As shown in FIG. 14, a value-added service node 14 of this embodiment of the present invention may include at least a packet receiving module 141 and a processing module 142, where the packet receiving module 141 is configured to receive a first detection packet for detecting a service chain, where the service chain includes at least one value-added service node, and the first detection packet carries status information of each value-added service node; and the processing module 142 is configured to determine, according to the first detection packet, whether status information of the value-added service node needs to be acquired, and acquire the status information of the value-added service node when the status information of the value-added service node needs to be acquired; and generate a second detection packet according to the first detection packet and the acquired status information, and send the second detection packet to a next hop.

In another embodiment, if the processing module 142 determines not to acquire status information of the value-added service node, the processing module 142 sends the first detection packet to the next hop as the second detection packet.

Optionally, the first detection packet further carries a collection decision label; and when determining whether the status information of the value-added service node needs to be acquired, the processing module 142 is configured to determine, according to the collection decision label, whether the status information of the value-added service node needs to be acquired.

In another optional implementation manner, after the packet receiving module 141 receives the first detection packet, the processing module 142 may send the first detection packet to the next hop as the second detection packet.

In still another optional implementation manner, after the packet receiving module 141 receives the first detection packet, the processing module 142 may directly acquire status information of the node in which the processing module 142 is located, generates a second detection packet, where the second detection packet carries the acquired status information, and sends the generated second detection packet to the next hop.

Further, the packet receiving module 141 is configured to receive a notification packet for detecting the service chain, where the notification packet carries routing information of each value-added service node; and the processing module 142 is further configured to forward the notification packet to the next hop according to the routing information, so that an egress delivery node on the service chain sends a detection packet when receiving the notification packet.

Further, the packet receiving module 141 is configured to receive a fault location packet of the service chain, where the fault location packet carries routing information of each value-added service node; and the processing module 142 is further configured to forward the fault location packet to the next hop according to the routing information, and feed back a fault location reply packet to an ingress delivery node on the service chain, where the fault location reply packet includes status information of at least one node of the value-added service node and a node at the next hop.

Further, the packet receiving module 141 is configured to receive a fault location reply packet sent by another value-added service node, and the processing module 142 may be further configured to send the acquired fault location reply packet to the next hop according to routing information carried in the fault location reply packet.

Further, the processing module 142 is configured to acquire status information of the value-added service node according to a preset detection period; and send the acquired status information to a controller, so that the controller determines, according to the status information, whether the value-added service node is in a normal running state.

It can be understood that, functions of functional modules of the controller 14 in this embodiment may be implemented according to the methods in the foregoing method embodiments, reference may be made to related descriptions of the method embodiments in FIG. 3 to FIG. 6, and details are not described herein again.

Figure 15:
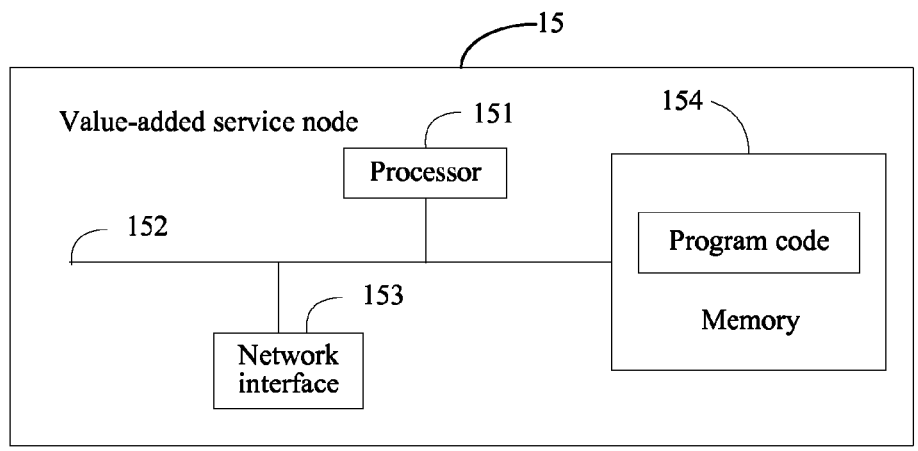
FIG. 15 is a schematic structural diagram of another value-added service node according to an embodiment of the present invention.

Referring to FIG. 15, FIG. 15 is a schematic structural diagram of another value-added service node according to an embodiment of the present invention, and as shown in FIG. 15, a value-added service node 15 may include at least one processor 151, such as a CPU, at least one communications bus 152, a network interface 153, and a memory 154. The network interface 153 is configured to send and receive packets; and the communications bus 152 is configured to implement connections and communication among these components. The memory 154 may be a high-speed RAM memory, or may be a non-volatile memory, for example, at least one magnetic disk memory. The memory 154 has stored a group of program code, and the processor 151 is configured to invoke the program code stored in the memory 154, to perform the method shown in FIG. 6.

A sequence of the steps of the method in the embodiments of the present invention may be adjusted, and certain steps may also be merged or removed according to an actual need.

Merging, division, and removing may be performed on the modules or the units in the embodiments of the present invention according to an actual need.

In the description of the specification, the description made with reference to terms such as "one embodiment", "some embodiments", "example", "specific example" or "some examples" means that specific features, structures, materials or characteristics described with reference to the embodiment or example are included in at least one embodiment or example of the present invention. In the specification, the foregoing exemplary expressions of the terms are not necessarily with respect to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in the specification, as long as they do not conflict each other.

In addition, the terms "first" and "second" are merely with respect to a purpose of description, and shall not be understood as an indication or implication of relative importance or implicit indication of the number of indicated technical features. Therefore, a feature limited by "first" or "second" may explicitly or implicitly includes at least one of the feature. In the description of the present invention, unless otherwise specified, "multiple" means at least two, for example, two or three.

Any process or method described in the flowcharts or described in another manner herein may be construed as representing a module, segment, or portion of code that includes one or more executable instructions for implementing specified logical functions or process steps. In addition, the scope of the exemplary implementation manners of the present invention includes alternative implementations, in which the functions may occur out of the order shown or discussed, for example, the functions may be executed substantially concurrently, or may be executed in the reverse order, depending upon the functionality involved. This should be understood by a person skilled in the art of the embodiments of the present invention.

In addition, functional units in the embodiments of the present invention may be integrated into one processing module, or each of the units may exist alone physically, or two or more units are integrated into one module. The integrated module may be implemented in a form of hardware, or may be implemented in a form of a software functional module. When the integrated module is implemented in the form of a software functional module and sold or used as an independent product, the integrated unit may be stored in a computer-readable storage medium.

The foregoing storage medium may be a read-only memory, a magnetic disk or an optical disk. Although the embodiments of the present invention are shown and described above, it can be understood that, the foregoing embodiments are exemplary, and cannot be construed as a limitation to the present invention. Within the scope of the present invention, a person of ordinary skill in the art may make changes, modifications, replacement, and variations to the foregoing embodiments.

What is claimed is:

1. A service chain management method, comprising:
   receiving, by an ingress delivery node of a service chain, a detection packet for detecting a running state of the service chain, wherein the service chain comprises at least one value-added service node, and wherein the detection packet carries status information of each value-added service node;
   sending, by the ingress delivery node, the status information of each of the at least one value-added service node to a controller distinct from the service chain;
   receiving, by the ingress delivery node from the controller, a service allocation instruction when the service chain is in an abnormal running state, wherein the service allocation instruction comprises allocation information of the service chain and allocation information of a redundant service chain of the service chain; and
   determining, by the ingress delivery node according to the service allocation instruction, that the running state of the service chain is abnormal.

2. The method according to claim 1, wherein after receiving, by the ingress delivery node, the service allocation instruction, the method further comprises reconfiguring, by the ingress delivery node, traffic of the service chain and the redundant service chain according to the service allocation instruction.

3. The method according to claim 1, wherein before receiving, by the ingress delivery node, the detection packet for detecting the service chain, the method further comprises sending, by the ingress delivery node, a notification packet for detecting the service chain, wherein the notification packet carries routing information of each value-added service node.

4. The method according to claim 3, wherein after sending, by the ingress delivery node, the notification packet for detecting the service chain, the method further comprises:
   detecting, by the ingress delivery node, a faulty value-added service node on the service chain when the detection packet is not received within a first preset time;
   sending, by the ingress delivery node, the detected faulty value-added service node to the controller such that the controller acquires a redundant service chain of the service chain according to the faulty value-added service node;
   receiving, by the ingress delivery node, a service allocation instruction for the service chain and the redundant service chain, wherein the service allocation instruction is sent by the controller; and
   reconfiguring, by the ingress delivery node, traffic of the service chain and the redundant service chain according to the service allocation instruction.

5. The method according to claim 4, wherein detecting, by the ingress delivery node, the faulty value-added service node on the service chain comprises:
   sending, by the ingress delivery node, a fault location packet to the service chain, wherein the fault location packet carries routing information of each value-added service node such that each value-added service node that receives the fault location packet feeds back a fault location reply packet according to the fault location packet; and
   determining, by the ingress delivery node, the faulty value-added service node according to the received fault location reply packet.

6. The method according to claim 1, wherein the method further comprises using both the service chain and the redundant service chain to handle traffic of a service.

7. The method according to claim 2, wherein reconfiguring the traffic of the service chain and the redundant service chain comprises determining, according to the service allocation instruction from the controller, a ratio between first traffic passing through a first value-added service node of the service chain and second traffic passing through a second value-added service node of the redundant service chain.

8. A service chain management method, comprising:
   receiving, by a controller from an ingress delivery node of a first service chain that includes value-added service nodes, status information of each of the service nodes in the first service chain, wherein the controller is distinct from the first service chain;
   determining, by the controller based on the status information received from the ingress delivery node, a first value-added service node that is in the first service chain and that is in an abnormal running state;
   determining, by the controller, according to a preset policy library, one or more service chains on which the first value-added service node that is in the abnormal running state is located, wherein the one or more service chains include the first service chain;

acquiring, by the controller, one or more redundant service chains for the one or more service chains on which the first value-added service node that is in the abnormal running state is located, wherein the one or more redundant service chains include a first redundant service chain for the first service chain, wherein the policy library comprises at least one policy, wherein each of the at least one policy comprises at least one service chain, and wherein each of the at least one service chain of each of the at least one policy has a same egress delivery node and a same ingress delivery node as each other service chain of the policy; and sending, by the controller, a service allocation instruction to a respective ingress delivery node of each of the one or more redundant service chains.

9. The method according to claim 8, wherein determining the first value-added service node that is in the abnormal running state comprises:

receiving a notification packet sent by the ingress delivery node, wherein the notification packet carries information about the first value-added service node; and determining, according to the notification packet, the first value-added service node as being in the abnormal running state.

10. The method according to claim 8, further comprising determining, according to the status information, a first volume of first traffic for a first value-added service node of the first service chain and a second volume of second traffic for a second value-added service node of the first redundant service chain.

11. An ingress delivery node on a service chain, wherein the ingress delivery node comprises:

a memory configured to store instructions; and a processor configured to execute the instructions to:
  receive a detection packet for detecting a running state of a service chain, wherein the service chain comprises at least one value-added service node, and wherein the detection packet carries status information of each value-added service node;
  send the status information of each value-added service node to a controller distinct from the service chain;
  receive, from the controller, a service allocation instruction when the service chain is in an abnormal running state, wherein the service allocation instruction comprises allocation information of the service chain and allocation information of a redundant service chain of the service chain; and
  determine that the running state of the service chain is abnormal according to the service allocation instruction.

12. The ingress delivery node according to claim 11, wherein the processor is further configured to execute the instructions to reconfigure traffic of the service chain and the redundant service chain according to the service allocation instruction.

13. The ingress delivery node according to claim 11, wherein the processor is further configured to execute the instructions to send a notification packet for detecting the service chain, and wherein the notification packet carries routing information of each value-added service node in the service chain.

14. The ingress delivery node according to claim 13, wherein the processor is further configured to execute the instructions to:

after sending the notification packet, detect a faulty value-added service node on the service chain when the detection packet is not received within a first preset time;

send the detected faulty value-added service node to the controller;

receive a service allocation instruction for the service chain and the redundant service chain, wherein the service allocation instruction is sent by the controller; and reconfigure traffic of the service chain and the redundant service chain according to the service allocation instruction.

15. The ingress delivery node according to claim 14, wherein, to detect the faulty value-added service node on the service chain, the processor is configured to execute the instructions to:

send a fault location packet to the service chain, wherein the fault location packet carries routing information of each value-added service node such that each value-added service node that receives the fault location packet feeds back a fault location reply packet according to the fault location packet; and determine the faulty value-added service node according to the received fault location reply packet.

16. The ingress delivery node of claim 11, wherein the processor is further configured to execute the instructions use both the service chain and the redundant service chain to handle traffic of a service.

17. The ingress delivery node according to claim 12, wherein to reconfigure the traffic of the service chain and the redundant service chain, the processor is further configured to execute the instructions to determine, according to the service allocation instruction from the controller, a ratio between first traffic passing through a first value-added service node of the service chain and second traffic passing through a second value-added service node of the redundant service chain.

18. A controller, comprising:

a memory configured to store instructions; and a processor configured to execute the instructions to:
  receive, from an ingress delivery node of a first service chain that includes value-added service nodes, status information of each of the value-added service nodes in the first service chain, wherein the controller is distinct from the first service chain;
  determine, based on the status information received from the ingress delivery node, a first value-added service node that is in the first service chain and that is in an abnormal running state, wherein the first value-added service node is distinct from the ingress delivery node:
  determine, according to a preset policy library, one or more service chains on which the first value-added service node that is in the abnormal running state is located, wherein the one or more service chains include the first service chain;
  acquire one or more redundant service chains for the one or more service chains on which the first value-added service node is located, wherein the one or more redundant service chains include a first redundant service chain for the first service chain, wherein the policy library comprises at least one policy, wherein each of the at least one policy comprises at least one service chain, and wherein each of the at least one service chain of each of the at least one policy has a same egress delivery node and a same ingress delivery node as each other service chain of the policy; and send a service allocation instruction to a respective ingress delivery node of each of the one or more redundant service chains.

19. The controller according to claim 18, wherein, to determine the first value-added service node that is in the abnormal running state, the processor is configured to execute the instructions to cause the processor to:

receive a notification packet sent by the ingress delivery node, wherein the notification packet carries information about the first value-added service node; and determine, according to the notification packet, the first value-added service node as being in the abnormal running state.

20. The controller according to claim 18, wherein the processor is further configured to execute the instructions to determine, according to the status information, a first volume of first traffic for a first value-added service node of the first service chain and a second volume of second traffic for a second value-added service node of the first redundant service chain.

* * * * *